United States Patent
Hammerschmidt et al.

(10) Patent No.: US 11,169,102 B2
(45) Date of Patent: Nov. 9, 2021

(54) METHOD AND MEASUREMENT DEVICE FOR ASCERTAINING THE THERMAL CONDUCTIVITY OF A FLUID

(71) Applicant: DIEHL METERING GMBH, Ansbach (DE)

(72) Inventors: Ulf Hammerschmidt, Braunschweig (DE); Andreas Benkert, Ansbach (DE); Christoph Sosna, Nuremberg (DE); Karl Herrmann, Eckental (DE)

(73) Assignee: Diehl Metering GmbH, Ansbach (DE)

( * ) Notice: Subject to any disclaimer, the term of this patent is extended or adjusted under 35 U.S.C. 154(b) by 138 days.

(21) Appl. No.: 16/554,666

(22) Filed: Aug. 29, 2019

(65) Prior Publication Data

US 2020/0072773 A1 Mar. 5, 2020

(30) Foreign Application Priority Data

Aug. 30, 2018 (DE) .......................... 102018006868.5

(51) Int. Cl.
 *G01N 25/18* (2006.01)
 *G01K 7/00* (2006.01)
 *G01K 1/00* (2006.01)

(52) U.S. Cl.
 CPC .................................. *G01N 25/18* (2013.01)

(58) Field of Classification Search
 USPC .......................................... 374/44, 163, 208
 See application file for complete search history.

(56) References Cited

U.S. PATENT DOCUMENTS

| | | |
|---|---|---|
| 5,452,601 A | 9/1995 | Hori et al. |
| 6,169,965 B1 | 1/2001 | Kubisiak et al. |
| 9,541,436 B2 | 1/2017 | Shanks |
| 9,885,235 B2 | 2/2018 | Xia et al. |
| 2013/0214274 A1 | 8/2013 | Merz et al. |
| 2014/0041438 A1* | 2/2014 | Heise ................. G01N 33/0036 73/25.03 |

(Continued)

FOREIGN PATENT DOCUMENTS

| | | |
|---|---|---|
| DE | 102014008284 A1 | 12/2015 |
| GB | 2496863 A | 5/2013 |

(Continued)

OTHER PUBLICATIONS

Translation of DE102014008384A1 (Year: 2015).*

*Primary Examiner* — Mirellys Jagan
(74) *Attorney, Agent, or Firm* — Laurence A. Greenberg; Werner H. Stemer; Ralph E. Locher (57) ABSTRACT

A measurement device ascertains the thermal conductivity of a fluid. The device has a fluid volume holding the fluid, a controller, and a sensor module disposed in the fluid volume. The sensor module has a supporting body and a plurality of sensor wires that extend freely between in each case two contact positions of the supporting body. One of the sensor wires serves as a heat source and is able to be energized for this purpose by the controller. The controller is set up to capture, via at least two of the sensor wires that serve as temperature sensors and are arranged at different distances from the heat source, temperature measurement values that depend on the temperature at the respective temperature sensor, and to ascertain the thermal conductivity in dependence on the temperature measurement values.

12 Claims, 3 Drawing Sheets

(56) References Cited

U.S. PATENT DOCUMENTS

| | | | |
|---|---|---|---|
| 2017/0102256 A1 | 4/2017 | Sosna et al. | |
| 2020/0124549 A1* | 4/2020 | Hammerschmidt | ... G01N 25/20 |
| 2021/0048401 A1* | 2/2021 | Hornung | ................ G01N 25/18 |

FOREIGN PATENT DOCUMENTS

| | | |
|---|---|---|
| JP | H06118047 A | 4/1994 |
| WO | 2015099762 A1 | 7/2015 |

* cited by examiner

METHOD AND MEASUREMENT DEVICE FOR ASCERTAINING THE THERMAL CONDUCTIVITY OF A FLUID

CROSS-REFERENCE TO RELATED APPLICATION

This application claims the priority, under 35 U.S.C. § 119, of German application DE 10 2018 006 868.5, filed Aug. 30, 2018; the prior application is herewith incorporated by reference in its entirety.

BACKGROUND OF THE INVENTION

Field of the Invention

The invention relates to a measurement device for ascertaining the thermal conductivity of a fluid, having a fluid volume holding the fluid, a control device, and a sensor module arranged in the fluid volume. The invention also relates to a method for ascertaining the thermal conductivity of a fluid.

In many application cases, it may be relevant to ascertain the thermal conductivity of a fluid, in particular of a gas. This can be useful for example for identifying or classifying various fluids, in particular various gases such as different natural gases, or various fluid compounds in dependence on an ascertained thermal conductivity. Various approaches are known for ascertaining thermal conductivity. For example, two concentric cylinder jackets can be used, with the outer cylinder jacket being actively kept at a specific temperature to serve as a temperature-controlled heat sink. The inner cylinder jacket is heated with fixed heat output so as to provide as the heat source a continuous heat flow of known intensity. The sample gas is arranged between the two cylinder jackets. It is now possible to determine the temperature drop between the cylinder jacket surfaces by way of two thermometers and, herefrom, the thermal conductivity. By rearranging the known equation for calculating a heat flow $\Phi$ through a cylinder jacket with a known thermal conductivity, it is possible to state the following equation for the thermal conductivity $\lambda$.

$$\lambda = \frac{\Phi}{2\pi \cdot L(T_i - T_a)} \ln\left(\frac{r_a}{r_i}\right). \quad (1)$$

Here, $\Phi$ is the constant heat flow, L is the length of the cylinder jacket surfaces in the vertical direction of the cylinder, $r_i$ is the radius of the inner cylinder jacket, $T_i$ is the temperature at this cylinder jacket, $r_a$ is the radius of the outer cylinder jacket, and $T_a$ is the temperature at this cylinder jacket.

Since the measurement principle explained above can be relatively complex to realize, instead, the stationary heating wire principle is frequently used, in which a thin wire is heated with constant power and a detector block that is arranged at a distance therefrom serves as a heat-controlled heat sink. The wire heats up to a varying extent depending on the thermal conductivity of the fluid situated between the wire and the heat sink. The wire is additionally used as a resistance thermometer, with the result that the temperature thereof and, in dependence thereon, the thermal conductivity can be ascertained. The problem here is that a sufficiently high measurement accuracy can typically be attained with this approach only if additionally a reference cell is used in which, as explained above, the thermal conductivity of a reference gas is measured in parallel and, by comparing the measurement values, a deviation of the thermal conductivities of sample fluid and reference fluid is ascertained.

Alternatively, thermal conductivity sensor technology can be used for this. A sample fluid is here located on both sides of a central heating plate, wherein the round or rectangular measurement cell is connected, at a distance from the heating plate, by way of heat-controlled cooling plates. These may be, for example, silicon plates that serve as passive heat sinks. As a measure of the thermal conductivity, the electrical voltage that is required to maintain a specified heating plate temperature is evaluated. A disadvantage of this approach is that here, relatively high heating plate temperatures and thus high average temperatures of the fluid that is examined are typically attained. Since the thermal conductivity of fluids is often dependent on temperature, the thermal conductivity that is frequently actually sought at room temperature can be merely estimated. In addition, very high temperature gradients can occur, creating at least the risk that the actual relationship between the temperature gradient and heat flow deviates from a linear relationship on which the measurement method described relies.

SUMMARY OF THE INVENTION

The invention is thus based on the object of specifying a possibility for ascertaining the thermal conductivity of a fluid which avoids the above-described problems, wherein it is to be possible in particular to utilize a sensor system of small construction and to measure the thermal conductivity over a broad temperature range substantially at the current ambient temperature.

The object is achieved according to the invention by way of a measurement device of the type mentioned in the introductory part, wherein the sensor module contains a supporting body and a plurality of sensor wires that extend freely between in each case two contact positions of the supporting body. One of the sensor wires serves as a heat source and is able to be energized for this purpose by the control device. The control device is set up to capture, via at least two of the sensor wires that serve as temperature sensors and are arranged at different distances from the heat source, temperature measurement values that depend on the temperature at the respective temperature sensor, and to ascertain the thermal conductivity in dependence on the temperature measurement values.

The utilization according to the invention of sensor wires that extend freely, that is to say in particular without any contact with the supporting body or other components of the measurement device, between the respective contact positions of the supporting body results in the heat source and the temperature sensors having a low heat capacity. In addition, this ensures that the heat source and the temperature sensors are thermally coupled substantially only via the fluid to be measured, in particular a gas. Thermal coupling via the supporting body, by contrast, can typically be regarded as negligible. As a result of these factors, very brief heating times with relatively low heat output can be utilized. For example, the heat source may be energized only for a time interval of between 10 ms and 100 ms, in particular between 20 ms and 40 ms, in particular for 40 ms. The heat output can lie for example between 3 mW and 30 mW, in particular be approximately 10 mW.

Due to the short measurement duration, it is possible to ensure that substantially no falsification of the measurement results due to convection in the fluid occurs. In addition, it is ensured that the temperature of the fluid to be investigated is raised only slightly, for example by only a few Kelvin, for example by between 3 K and 6 K, above the ambient temperature. This is advantageous firstly because in this way a measurement of the thermal conductivity is effected at a temperature that is very close to the ambient temperature and thus lies in the actually typically relevant temperature range. In addition, the relatively short temperature increase or the relatively low temperature of the heat source ensures that the temperature transfer between heat source and temperature sensors due to radiation is negligible, as a result of which another error source when ascertaining the thermal conductivity can be avoided.

As will be explained below in more detail, the measurement device, in particular the sensor module, can have a relatively simple construction and make possible measurements in a large operating temperature range, for example between −100° C. and 400° C. The measurement device according to the invention can thus be used in a large number of environments at low cost.

The sensor wires are to extend freely between the contact positions, which are to mean in particular that they are not to be in contact with the supporting body. In particular, they can be surrounded along their entire perimeter, that is to say perpendicular to the direction of extent, only by the fluid between the contact positions. Such an arrangement of the sensor wires can be implemented for example by way of the supporting body having a trench that can be produced in particular by an etching process and over which the sensor wires extend. The sensor wires can in particular all be located in one plane and/or extend parallel with respect to one another. Preferably, more than two of the sensor wires are provided as temperature sensors, for example four, five or six.

Since a freely arranged sensor wire serves as a heat source, the latter can be considered approximately as a line or cylindrical source, as long as the energizing time, as described above, is not too long. The temperature sensors can in particular be embodied such that they capture an overtemperature, that is to say the extent of the increase of the temperature during operation of the heat source with respect to non-operation. This can also be effected for example by way of the sensor wires that serve as temperature sensors forming in each case a resistor of a Wheatstone bridge. If the Wheatstone bridge is compensated before the heat source is energized, such that the voltage that drops across it is zero, that is to say if the deflection method which is known per se is used, the voltage that drops across the Wheatstone bridge is proportional to the temperature change. This permits a particularly simple evaluation of the temperature measurement values. However, other approaches for temperature measurement value evaluation are also possible in principle, for example the use of a look-up table for assigning a specific voltage drop to a specific temperature or the like.

As will be explained in more detail below, it is possible for ascertaining the thermal conductivity to take advantage of the fact that, due to the relatively low required heat output on account of the freely extending heat source, the temperature of the supporting body or of walls of the fluid volume, other components of the measurement device and parts of the fluid that are located at a relatively great distance from the heat source remains substantially unchanged. The components mentioned, in particular the supporting body, thus act as a type of virtual heat sink. As a result, after only a very short heating time of for example a few milliseconds, a substantially constant heat flow and substantially constant temperatures arise in the region of the temperature sensors that, as will be explained in more detail below, are preferably arranged relatively close to the heat source.

Consequently, the equation stated in the introductory part for ascertaining the thermal conductivity could in principle be used. However, the problem here is first, that in the measurement device according to the invention, the heat sink is not realized by virtue of active temperature control ensuring that a wall at a specific distance $r_a$ from the heat source serves as a heat sink. Instead, an effective or virtual heat sink is obtained by virtue of the temperature of the fluid substantially not changing at a specific distance from the heat source, in particular on account of an interaction with the supporting body that has a high heat capacity. However, this distance is dependent both on the concrete measurement geometry of the measurement device and on the heat output used and is therefore not immediately apparent from the dimensions of the measurement device and also theoretically determinable with sufficient accuracy only with difficulty. As will be explained below in more detail, this problem can be solved, however, by a plurality of temperature measurement values being available in the measurement device according to the invention, which means that the thermal conductivity can be ascertained despite the initially unknown distance from the virtual heat sink.

As has already been explained, typically a temperature that remains constant for a specific time interval is established at the individual temperature sensors relatively quickly after the beginning of the energizing of the heat source. Since in the evaluation typically a constant heat flow is assumed, the temperature measurement values should be captured at a time point at which said substantially constant temperature is present. This is possible for example by the temperature measurement capturing being effected with a fixed temporal delay of for example 10 ms-30 ms, preferably approximately 20 ms, after the start of the energizing of the heat source. Depending on the concrete structure of the measurement device, longer or shorter delay times can likewise be used. Preferably, temperature measurement values for all temperature sensors are captured at the same time. However, since the temperatures at the individual temperature sensors, as explained, remain constant for a relatively long time, for example a few 10 ms, it may also suffice to perform the measurements within a time interval of for example between 1 ms and 5 ms. This can be advantageous for example when a single analog-to-digital converter is to be used to capture all temperature measurement values, wherein this can be realized by way of time division multiplexing.

The advantages described, in particular the low heat output and required energizing time and measurement time, can in particular be attained if the sensor module is embodied in the form of a chip of relatively small construction, in particular a MEMS chip (microelectromechanical system). MEMS chips can form structures in the micrometre range or even in the sub-micrometre range. In this way, for example distances between the sensor wires of a few 10 μm or a few 100 μm can be realized.

The supporting body can consist of an insulator material or a semiconductor material, in particular silicon, wherein the sensor wires can be formed by the application of a conductive coating, in particular a metal or a metal alloy, on a respective support made from the same insulator material or semiconductor material that extends between the respective contact points. In particular, the supporting body and the supports for the respective sensor wires can be embodied in one piece. The supporting body and in particular the supports that are formed in one piece therewith can be produced as a three-dimensional structure by way of manufacturing steps that are known in principle in the field of MEMS chips. For example, a combination of lithography and etching processes can be used. Under cuts can be realized for example by way of dry etching, that is to say material removal due to accelerated ions or electrons. The sensor wires can span a trench in the supporting body formed in particular by wet etching or dry etching, the trench being in particular rectangular or trapezoidal. The distance of the sensor wires from the supporting body in a central region of the sensor wires can be between 50 μm and 1 mm, in particular between 200 μm and 400 μm, for example 300 μm. This can be realized for example by way of a corresponding trench depth of the trench in the supporting body.

The conductive layer can be formed for example by way of nickel. The coating can be applied exclusively on one side, for example on an upper side of the support that faces away from the trench, or alternatively can be applied circumferentially around the support. The conductive layer can extend beyond the region of the sensor wires or beyond the contact positions. This can be useful for example for providing contact pads for electrical contact in a more solid region of the supporting body.

Forming the supporting body or the supports from a semiconductor material can be advantageous because corresponding approaches for microstructuring are well known for such semiconductor materials, in particular for silicon, as a result of which known technologies for producing the supporting body with the sensor wires arranged thereon can be used. However, the semiconductor material should typically act as an insulator in the measurement device according to the invention, with the result that preferably a semiconductor material with a bandgap that is greater than the operating voltage of the heat source or the temperature sensors is used.

The distance of at least one of the temperature sensors from the heat source can be less than 200 μm or less than 100 μm and/or the distance of the temperature sensor that is located the furthest from the heat source from the heat source can be less than 1 mm or less than 500 μm. The distance of the temperature sensor that is located the closest to the heat source from the heat source can be at least 10 μm, at least 20 μm or at least 30 μm. For example, the distance can be 50 μm. The distance of the temperature sensor that is located the furthest away from the heat source can be at least 100 μm, at least 200 μm or at least 300 μm. For example, the distance can be 400 μm. For example, a total of six sensor wires can be used, five of which serve as temperature sensors. They can have a respective distance of 50 μm, 100 μm, 200 μm, 300 μm and 400 μm from the sensor wire that serves as the heat source.

The length of the sensor wires or the distance between the contact points can be between 0.5 mm and 5 mm, for example 2 mm. As explained above, the relatively small dimensions can be implemented by way of known methods for microstructuring, in particular of semiconductors. It is known that corresponding structuring methods can attain structure sizes in the sub-micrometre range, in particular of a few 10 nm.

The control device can be set up to ascertain, in dependence on the temperature measurement values, a parameter or a plurality of parameters of a mathematical model that describes the relationship between the distance of a respective temperature sensor from the heat source and the temperature measurement value that is ascertained thereby, or that describes, for at least one pair of the temperature sensors, the relationship between the distances of the temperature sensors of the respective pair from the heat source and a difference of the temperatures at said temperature sensors, and to ascertain the thermal conductivity in dependence on the parameter or one of the parameters. The mathematical model can be described by one equation or a plurality of equations that depend on the parameter or the parameters. In addition, known parameters concerning the measurement geometry, for example the length of the sensor wires or the distances between the contact points of the sensor wires, can be included in the model.

Since in the case of short measurement times it is possible to approximately assume that a heat transport due to convection can be considered to be negligible, it is also possible to use models that describe a heat transport through rigid bodies or only on account of an existing heat capacity of the fluid. For example, the model for the heat transport through cylindrical shells, which was already discussed in the introductory part, can be used. It is possible here to assume with good accuracy that the heat flow (I) from a temperature sensor at the distance $r_i$ from the heat source to a further temperature sensor or the virtual heat sink at the distance $r_a$ from the heat source corresponds to the heat flow between cylinder jackets having the radii $r_i$ and $r_a$ and exhibiting the temperatures $T_i$, $T_a$. It is thus possible to ascertain the thermal conductivity λ with known heat flow Φ, known length of the sensor wires L and known temperatures $T_i$ and $T_a$ for known locations with the distances $r_i$ and $r_a$ using the equation already stated in the introductory part:

$$\lambda = \frac{\Phi}{2\pi \cdot L(T_i - T_a)} \ln\left(\frac{r_a}{r_i}\right). \tag{1}$$

If exactly two temperature sensors are used, the distances $r_i$ and $r_a$ thereof and the temperatures $T_i$, $T_a$ captured at the temperature sensors can be used directly to ascertain the thermal conductivity λ.

The control device is preferably set up to energize the heat source during a heating interval with a specified power and to ascertain the thermal conductivity in dependence on the specified power. On account of the virtual heat sink discussed above, it is possible to assume that a constant heat output for a time interval results in a constant heat flow within the heating interval. Consequently, the heat flow Φ in the above equation can be replaced by the power P with which the heat source is energized, as a result of which this equation can be solved for a pair of temperature sensors.

As explained above, the model can describe the relationship between the distance of the temperature sensor or the temperature sensors from the heat source and the temperature measurement value or difference of the temperatures ascertained by the temperature sensor or temperature sensors in dependence on a constant heat flow from the heat source to the temperature sensors, wherein the heat flow depends on the specified power.

As has already been explained, preferably more than two temperature sensors at different distances from the heat source are used. In principle, it would be possible to ascertain in each case a preliminary thermal conductivity for a plurality of pairs of two selected heat sensors and to determine the ultimately ascertained thermal conductivity for example by averaging or by selecting a median from the preliminary thermal conductivities. However, preferably a common model is parameterized on the basis of said data. To achieve this, the equation discussed above can initially be rearranged as follows:

$$(T_i - T_a) = \frac{P}{2\pi \cdot L \cdot \lambda} \ln\left(\frac{r_a}{r_i}\right) = -k \cdot \ln(r_i) + k \cdot \ln(r_a), \quad (2)$$

wherein:

$$k = \frac{P}{2\pi \cdot L \cdot \lambda}. \quad (3)$$

This equation defines a temperature difference between the temperature $T_i$ at the distance $r_i$ from the heat source and the temperature $T_a$ at the distance $r_a$ from the heat source in dependence on the difference of the logarithms of the distances $r_i$ and $r_a$. The proportionality factor k can, with known power P and length L of the sensor wires, be used directly to determine the thermal conductivity. To this end, initially the parameter k can be calculated for example by solving an optimization problem. To this end, for a plurality of pairs of the temperature sensors, the respective distances $r_i$ and $r_a$ of the temperature sensor that is in each case located closer to the heat source and of the temperature sensor that is in each case located further away from the heat source can be used in said equation, and a measure of the error of the temperature difference $(T_i-T_a)$ can be minimized. For example, the sum of squared errors can be minimized.

Since, as has already been explained, in the case of the measurement geometry used with sufficiently short energization times of the heat source and sufficiently low heat outputs on account of a comparatively high thermal capacity of the supporting body or other components of the measurement device, the fluid continues to have, at a specific distance from the heat source, the constant ambient temperature, independently of whether the heat source is energized, and thus serves approximately as a perfect heat sink, it is possible to modify the above equation such that a relationship between the distance of a temperature sensor from the heat source and the temperature value that is ascertained thereby is directly described. In the above equation, $T_a$ generally describes, as already explained, a temperature at the distance $r_a$ from the heat source. However, at a specific, initially undetermined distance $r_a$, the virtual heat sink is effective, with the result that the temperature here corresponds to the fluid temperature before heating by way of the heat source. If this temperature is used as $T_a$, the difference $(T_i-T_a)$, designated $\Delta T_i$ below, is, however, exactly the overtemperature by which the temperature at the temperature sensor at the position $r_i$ was increased by energizing the heat source. As has been explained above, the temperature measurement values can be captured for example by using a previously compensated Wheatstone bridge such that they are proportional to said variable by a known proportionality constant or correspond thereto. As a consequence, it is no longer necessary to consider the temperature difference between two temperatures, rather the temperature measurement value can be evaluated directly.

The distance of the heat sink $r_a$ is initially a free parameter. The following substitution is made for providing a clearer illustration of how A can be ascertained in this case:

$$m=-k \quad (4)$$

$$n=k\cdot\ln(r_a). \quad (5)$$

This gives the following equation:

$$\Delta T_i = m \cdot \ln(r_i) + n. \quad (6)$$

However, this corresponds to a linear equation or a linear relationship between the temperature measurement value, or a variable $\Delta T_i$ that is proportional thereto directly by a known proportionality factor, and the logarithm of the distance $r_i$ of the respective temperature sensor from the heat source. The parameters m, n can thus be calculated by determining a line of best fit for the different temperature measurement values $T_i$ and logarithms of the distances $r_i$ of the temperature sensors.

Once the parameters m and k, respectively, have been ascertained, the thermal conductivity $\lambda$ can be determined as follows:

$$\lambda = -\frac{P}{2\pi \cdot L \cdot m} = \frac{P}{2\pi \cdot L \cdot k}. \quad (7)$$

Optionally, if desired, the distance $r_a$ of the virtual heat sink can also be determined:

$$r_a = \exp\left(\frac{-n}{m}\right). \quad (8)$$

The parameter in dependence on which the thermal conductivity is ascertained, that is to say m or k in the example above, can be a proportionality factor that describes a relationship between a function that is dependent on the distance of the temperature sensor or of at least one of the temperature sensors from the heat source and the temperature measurement value or the difference of the temperatures. If k is used as a parameter, the logarithm of the quotient of two distances or the difference of the logarithms of the distances is scaled as the function.

The measurement device can be set up such that the temperature measurement value is proportional to a temperature increase at the respective temperature sensor that is caused by the energization of the heat source. For example, the sensor wire of the respective temperature sensor can be a resistor of a Wheatstone bridge that is operated in accordance with the deflection method. For example, the voltage dropping across the Wheatstone bridge can be compensated to zero directly before the energization of the heat source, according to which, in the case of a temperature change that is not too pronounced, a voltage dropping across the bridge is proportional to the temperature change.

In addition to the measurement device according to the invention, the invention relates to a method for ascertaining the thermal conductivity of a fluid. The fluid is located in a fluid volume in which a sensor module is arranged. The sensor module contains a supporting body and a plurality of sensor wires that extend freely between in each case two contact positions of the supporting body is used. One of the sensor wires is used as a heat source and is to this end energized by a control device. Wherein temperature measurement values that are dependent on the temperature at the respective temperature sensor are captured by the control device for at least two of the sensor wires that serve as temperature sensors and are arranged at different distances from the heat source, and the thermal conductivity is ascertained in dependence on the temperature measurement values.

The method according to the invention can be developed with the features explained with respect to the measurement device according to the invention and having the advantages specified there, and vice versa. In particular, the method according to the invention can comprise the previously described steps for energizing the heat source or for capturing the temperature measurement values and/or for ascertaining the thermal conductivity from the temperature measurement values.

Other features which are considered as characteristic for the invention are set forth in the appended claims.

Although the invention is illustrated and described herein as embodied in a measurement device for ascertaining the thermal conductivity of a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
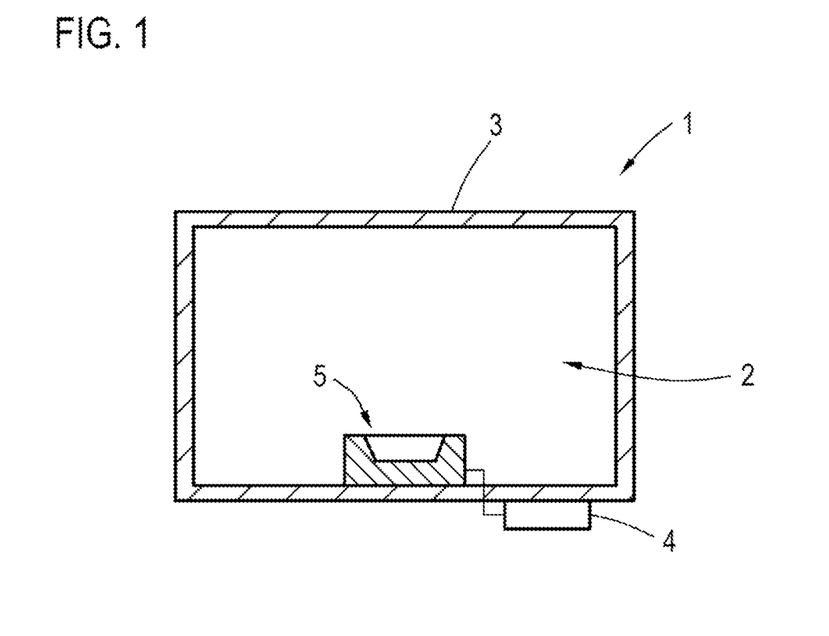
FIG. 1 is an illustration showing an exemplary embodiment of a measurement device according to the invention that is set up to perform an exemplary embodiment of the method according to the invention.

Referring now to the figures of the drawings in detail and first, particularly to FIG. 1 thereof, there is shown a measurement device 1 for ascertaining a thermal conductivity of a fluid. The fluid is contained in a fluid volume 2 that, in the example shown, is delimited by a wall 3 of the measurement device 1. The measurement device 1 additionally has a control device 4 and a sensor module 5 arranged in the fluid volume 2. The sensor module 5 in FIG. 1 is depicted to be relatively large with respect to the measurement volume for reasons of clarity. However, the sensor module 5 is preferably a MEMS chip that can have a side length of less than 1 mm, for example.

Figure 2:
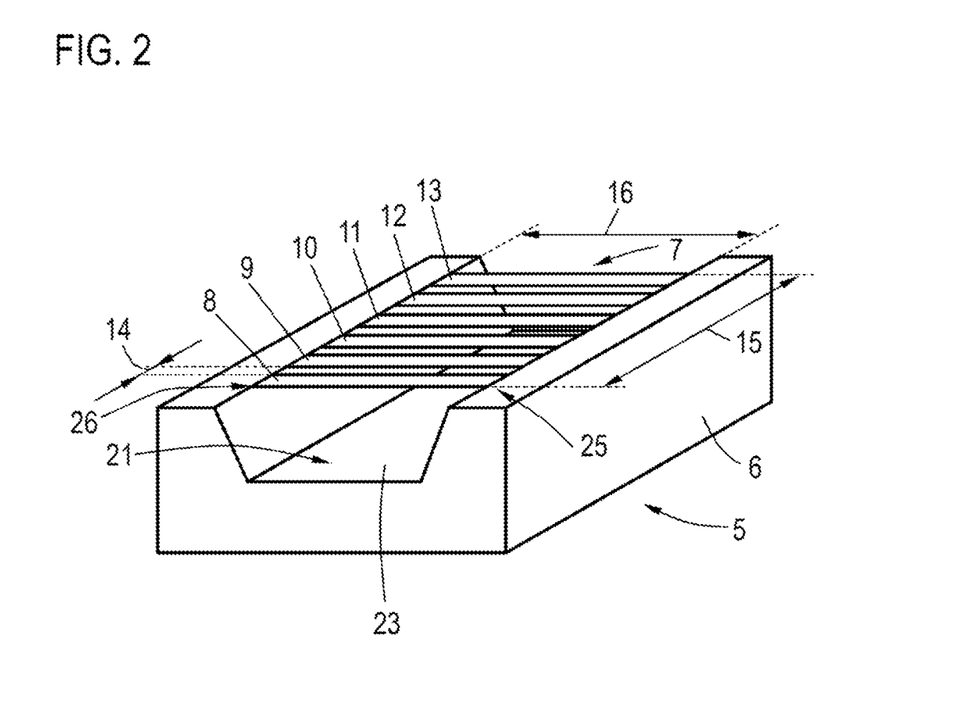
FIG. 2 is a perspective view of a sensor module of the measurement device shown in FIG. 1.
Figure 3:
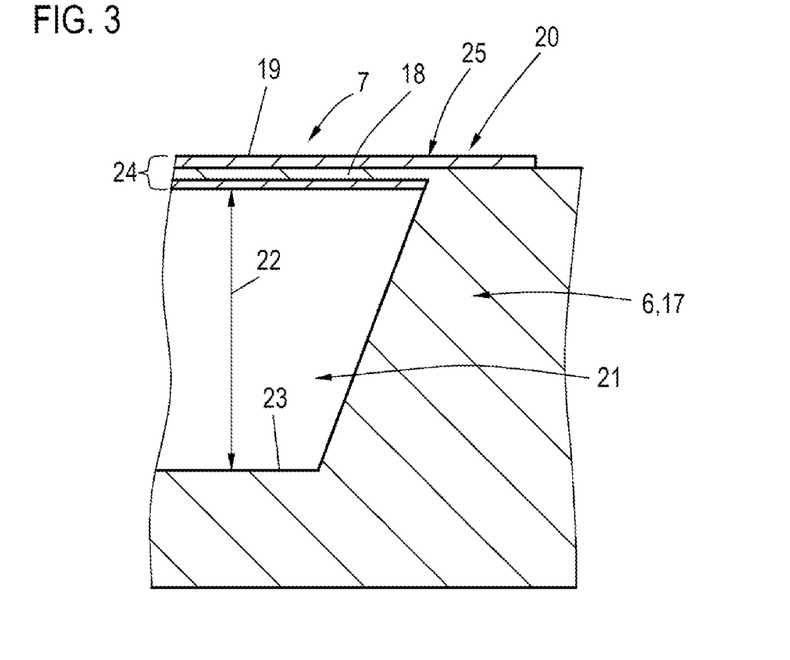
FIG. 3 is a partial, sectional view of the sensor module of the measurement device shown in FIG. 1.

The construction of the sensor module 5 will be explained below with reference to FIGS. 2 and 3. Here, FIG. 2 shows a perspective view of the sensor module 5, wherein, for reasons of clarity, only the parts that are essential for the following description are depicted and for example connection apparatuses for connecting to the control device 4 are not illustrated. FIG. 3 shows a detail view of a section through the sensor module 5 parallel to sensor wires 7.

The sensor module 5 has a supporting body 6 and a plurality of sensor wires 7 that extend between in each case two contact positions 25, 26 of the supporting body 6. The sensor wires 7 span a trapezoidal trench 21 of the supporting body 6, formed by way of etching, for example. The sensor wires 7 have a substantially identical design, are all located in one plane and extend in a substantially parallel manner with respect to one another. One of the sensor wires 7 is used in the measurement device 1 as a heat source 8. The control device 4 can energize the heat source 8 with a specified power so as to increase the temperature of the fluid in the immediate vicinity of the heat source 8.

The further sensor wires 7 serve as temperature sensors 9-13 and are arranged at differing distances from the heat source 8. A distance 14 of the temperature sensor 9 that is arranged closest to the heat source 8 from the heat source 8 can be 50 μm, for example. The temperature sensor 13 that is located the furthest from the heat source 8 can have a distance 15 of 400 μm from the heat source 8, for example. In the example shown, the distances of the further temperature sensors 10, 11, 12 from the heat source 8 are 100 μm, 200 μm and 300 μm. The length 16 of the sensor wires 7 can be a few 100 μm or a few millimetres.

As is apparent from FIG. 3, the supporting body 6 and supports 18 of the sensor wires 7 are formed in one piece from an insulator or semiconductor material 17, in particular silicon. Using lithography and etching processes, it is possible to produce structures with accuracy in the sub-micrometre range from such materials. In order to obtain electrical insulation of the sensor wires 7 with respect to one another, an insulator or a semiconductor having a bandgap that is greater than the operating voltages of the sensor wires 7 should be used. A conductivity of the individual sensor wires 7 is produced by providing them with a conductive layer 19. The latter can extend beyond the contact positions 25 onto the supporting body 6 itself, for example to make possible electrical contact in this region 20 to connections of the control device 4.

The sensor wires 7 can have a thickness 24 of a few 10 μm. In order to obtain sufficient thermal decoupling from the supporting body 6, the distance 22 from a bottom 23 of the trench 21 can be a few 100 μm, for example 300 μm.

The sensor wires 7 that serve as the temperature sensors 9-13 are connected to form Wheatstone bridges by additional resistors (not illustrated), wherein they are compensated before energization of the heat source 8 such that there is substantially no voltage drop across the respective bridge. It is possible in this way to ensure that a voltage drop across the respective bridge, that is to say a temperature measurement value captured by the respective temperature sensors 9-13, is proportional to a temperature increase that results from heating by way of the heat source 8.

Figure 4:
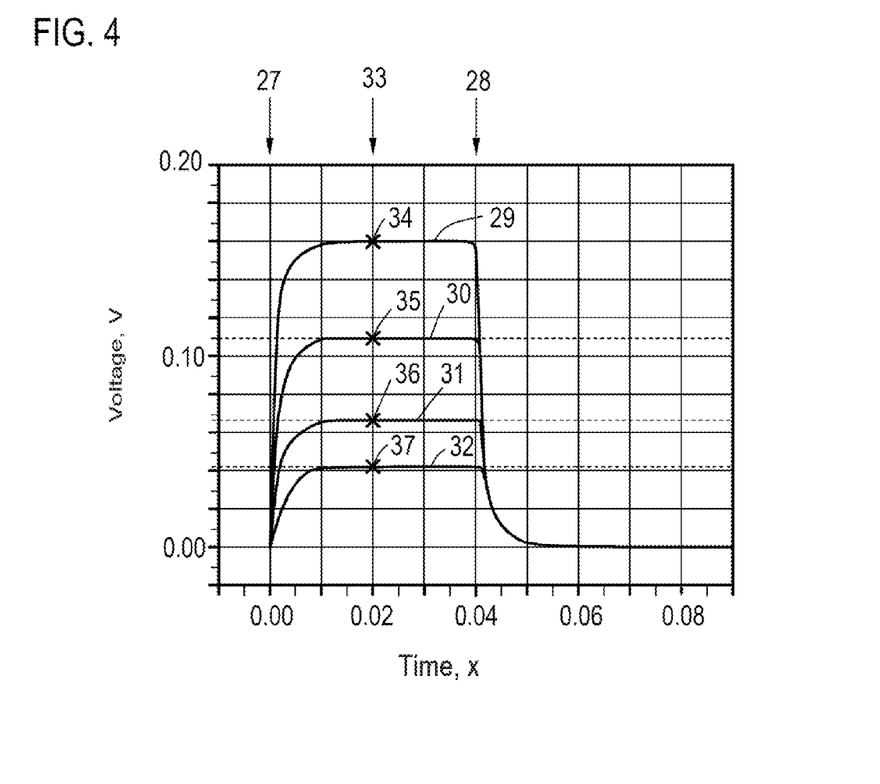
FIGS. 4-6 are graphs for capturing and processing temperature measurement values.

Capturing of temperature measurement values and ascertaining the thermal conductivity from the temperature measurement values will be explained below. For reasons of clarity, only measurements of the first four temperature sensors 9-12 will be shown in the associated diagrams depicted in FIGS. 4-6. FIG. 4 here shows the profile of the voltages at the temperature sensors 9-12 or at the associated Wheatstone bridges. The time point 27 gives the start of an energization of the heat source 8 by way of the control device 4 at a constant power of for example 6 mW. At the time point 28, the supply of current is interrupted. The fluid used in the example shown is methane. The curve 29 shows the voltage drop across the temperature sensor 9, the curve 30 shows the voltage drop across the temperature sensor 10, the curve 31 shows the voltage drop across the temperature sensor 11, and the curve 32 shows the voltage drop across the temperature sensor 12. As was explained above, the voltage drop is proportional to the temperature increase over the ambient temperature before heating by way of the heat source 8.

The curves 29-32 and thus also the temperatures at the temperature sensors 9-12 initially increase sharply and then remain at a constant voltage or temperature, which is, however, different for each of the temperature sensors 9-12, up to the point where the current supply to the heat source 8 is interrupted. Such a behaviour would be expected if a heat sink that is kept at a constant temperature, that is to say a heat sink that absorbs the heat flow provided by the heat source 8 without increasing its temperature, were located on the other side of the temperature sensor 12. This behaviour is a result of the fact that heating is performed for a relatively short time and with relatively low power. The thermal energy caused by the entire heating pulse is thus not sufficient for measurably influencing the temperature of the supporting body 6 or of other components of the measurement device and of fluid that is located relatively far away in the gas volume 2. The result is a virtual heat sink at a specific distance at which the temperature substantially does not change.

Figure 5:
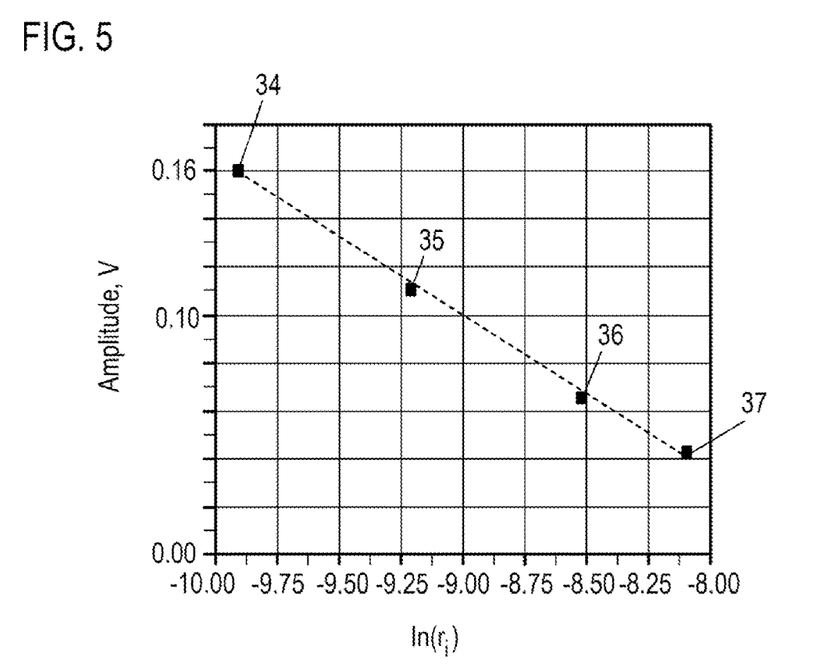

As has already been explained above, in such a case, parameters m, n that parameterize a line of best fit that describes the relationship between the logarithm of the distance r; of the respective temperature sensor 9-12 from the heat source 8 and the temperature measurement value can be calculated. Such a line of best fit is illustrated in FIG. 5 and is described by the following equation which has already been discussed:

$$\Delta T_i = m \cdot \ln(r_i) + n. \quad (6)$$

Here, the variable $\Delta T_i$ can optionally directly indicate the temperature difference or describe the voltage difference. Corresponding temperature measurement values 34-37 are captured at the time point 33 shown in FIG. 4, that is to say for example after 20 ms, after the temperatures or the voltage drops for the temperature sensors 9-12 have stabilized. The line of best fit shown in FIG. 5 is determined in a manner such that a measure of the deviation of the measurement points 34-37 from this line, for example a squared error, is minimized. The thermal conductivity $\lambda$, can be calculated as follows from the gradient m of the straight line, as has already been explained:

$$\lambda = -\frac{P}{2\pi \cdot L \cdot m}. \quad (9)$$

The procedure described makes the determination of the thermal conductivity via a sensor module of highly compact construction and with great accuracy possible. The method described or the measurement device described can be used over a wide range of ambient temperatures and ascertains the thermal conductivity approximately at the actual ambient temperature.

Figure 6:
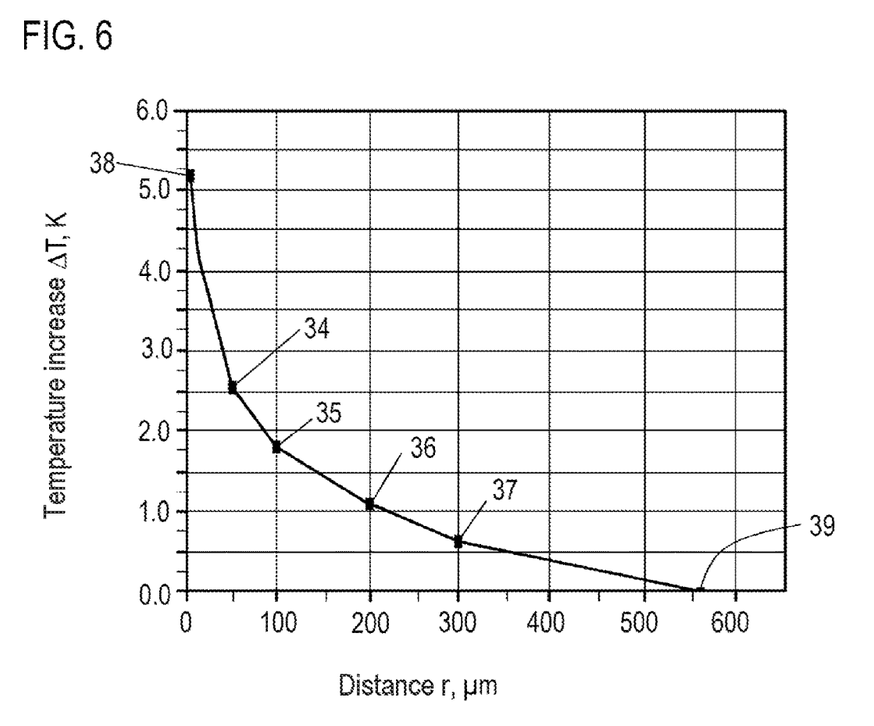

The low temperature difference used is also apparent for example in FIG. 6, depicting the temperature increases for the temperature measurement values 34-37 that are ascertained on the basis of the voltage amplitudes shown in FIGS. 4 and 5. It is additionally possible to ascertain from the above-described line of best fit the temperature difference 38 that is illustrated in FIG. 6 and is a little more than 5 K in the example shown at the heating element. FIG. 6 additionally shows the point 39, which corresponds to the distance of a virtual heat sink starting from which no increase of the fluid temperature above the ambient temperature is expected, at least in the case where operation of the heat source is not very long.

The following is a summary list of reference numerals and the corresponding structure used in the above description of the invention:
1 Measurement device
2 Fluid volume
3 Wall
4 Control device
5 Sensor module
6 Supporting body
7 Sensor wire
8 Heat source
9 Temperature sensor
10 Temperature sensor
11 Temperature sensor
12 Temperature sensor
13 Temperature sensor
14 Distance
15 Distance
16 Length
17 Semiconductor material
18 Support
19 Layer
20 Region
21 Trench
22 Distance
23 Bottom
24 Thickness
25 Contact position
26 Contact position
27 Time point
28 Time point
29 Curve
30 Curve
31 Curve
32 Curve
33 Time point
34 Temperature measurement value
35 Temperature measurement value
36 Temperature measurement value
37 Temperature measurement value
38 Temperature difference
39 Point

The invention claimed is:

1. A measurement device for ascertaining a thermal conductivity of a fluid, the measuring device comprising:
a fluid volume holding the fluid;
a controller;
a sensor module disposed in said fluid volume, said sensor module having a supporting body and a plurality of sensor wires each extending freely between two respective contact positions of said supporting body, said supporting body being formed from an insulator material or a semiconductor material, said sensor wires each being formed by an application of a conductive coating on a respective support made from said insulator material or said semiconductor material extending between said respective contact positions of said supporting body, wherein one of said sensor wires serves as a heat source and is able to be energized for heating by said controller; and
said controller is set up to capture, via at least two of said sensor wires functioning as temperature sensors and disposed at different distances from said heat source, temperature measurement values that depend on a temperature at each of said temperature sensors, and to ascertain the thermal conductivity in dependence on the temperature measurement values.

2. The measurement device according to claim 1, wherein said supporting body and each said support for each of said sensor wires are embodied in one piece.

3. The measurement device according to claim 1, wherein a distance of at least one of said temperature sensors from said heat source is less than 200 µm and/or in that a distance of said temperature sensor that is disposed furthest from said heat source is less than 1 mm.

4. The measurement device according to claim 1, wherein said controller is set up to energize said heat source during a heating interval with a specified power and to ascertain the thermal conductivity in dependence on the specified power.

5. The measurement device according to claim 1, wherein the measurement device is set up such that a temperature measurement value is proportional to a temperature increase at a respective said temperature sensor that is caused by energization of said heat source.

6. The measurement device according to claim 1, wherein:
   said semiconductor material is silicon; and
   said conductive coating contains a metal or a metal alloy.

7. The measurement device according to claim 1, wherein a distance of at least one of said temperature sensors from said heat source is less than 100 µm and/or in that a distance of said temperature sensor that is disposed furthest from said heat source is less than 500 µm.

8. The measurement device according to claim 1, wherein said controller is set up to ascertain, in dependence on the temperature measurement values, a parameter or a plurality of parameters of a mathematical model that describes a relationship between a distance of a respective one of said temperature sensors from said heat source and a temperature measurement value that is ascertained thereby, or that describes, for at least one pair of said temperature sensors, a relationship between distances of said temperature sensors of said pair of said temperature sensors from said heat source and a difference of temperatures at said temperature sensors of said pair, and to ascertain the thermal conductivity in dependence on at least one said parameter.

9. The measurement device according to claim 8, wherein the mathematical model is used to describe the relationship between the distance of said temperature sensor or said temperature sensors from said heat source and the temperature measurement value or a difference of the temperatures ascertained by said temperature sensor or said temperature sensors in dependence on a constant heat flow from said heat source to said temperature sensors, wherein the constant heat flow depends on a specified power.

10. The measurement device according to claim 8, wherein the parameter in dependence on which the thermal conductivity is ascertained is a proportionality factor that describes a relationship between a function that is dependent on the distance of said temperature sensor or of at least one of said temperature sensors from said heat source and the temperature measurement value or a difference of the temperatures.

11. A method for ascertaining a thermal conductivity of a fluid disposed in a fluid volume in which a sensor module is disposed, which comprises the steps of:
   forming the sensor module with a supporting body and a plurality of sensor wires that each extend freely between two respective contact positions of the supporting body, the supporting body being formed from an insulator material or a semiconductor material, the sensor wires each being formed by an application of a conductive coating on a respective support made from the insulator material or the semiconductor material extending between the respective contact positions of the supporting body;
   using one of the sensor wires as a heat source which is energized by a controller;
   capturing temperature measurement values that are dependent on a temperature at a respective temperature sensor by the controller for at least two of the sensor wires that serve as temperature sensors and are disposed at different distances from the heat source; and
   ascertaining the thermal conductivity in dependence on the temperature measurement values.

12. A measurement device for ascertaining a thermal conductivity of a fluid, the measuring device comprising:
   a fluid volume holding the fluid;
   a controller;
   a sensor module disposed in said fluid volume, said sensor module having a supporting body and a plurality of sensor wires each extending freely between two respective contact positions of said supporting body, said supporting body being formed from a substrate material, said sensor wires each being formed by an application of a conductive coating on a respective support made from said substrate material extending between said respective contact positions of said supporting body, wherein one of said sensor wires serves as a heat source and is able to be energized for heating by said controller; and
   said controller is set up to capture, via at least two of said sensor wires functioning as temperature sensors and disposed at different distances from said heat source, temperature measurement values that depend on a temperature at each of said temperature sensors, and to ascertain the thermal conductivity in dependence on the temperature measurement values.

* * * * *